L. BENSON.
CRANKING DEVICE.
APPLICATION FILED MAR. 8, 1915.

1,171,309.

Patented Feb. 8, 1916.
2 SHEETS—SHEET 1.

WITNESSES:
Edward A. Breed
Blanche L. Chartier

INVENTOR
Lawrence Benson,
BY
Richard Peale Hinick
ATTORNEY

L. BENSON.
CRANKING DEVICE.
APPLICATION FILED MAR. 8, 1915.
1,171,309.
Patented Feb. 8, 1916.
2 SHEETS—SHEET 2.
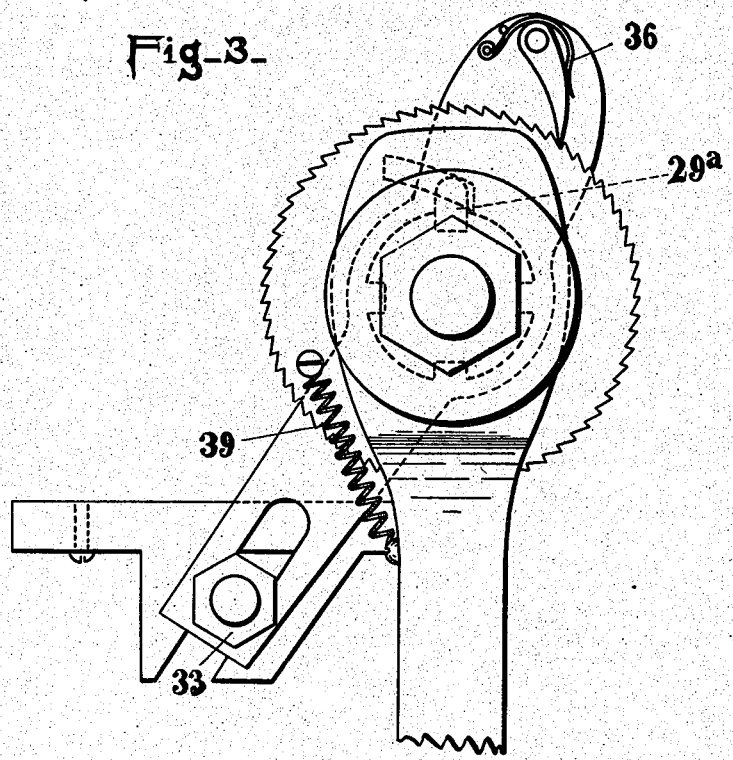
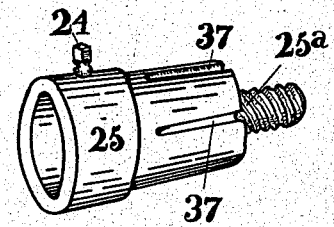
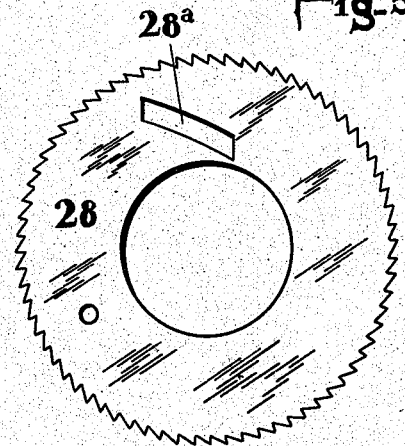
WITNESSES:
Edward A. Breed,
Blanche P. Chartier.
INVENTOR
Lawrence Benson,
BY
Richard Peale Herrick
ATTORNEY

UNITED STATES PATENT OFFICE.

LAWRENCE BENSON, OF NORWICH, CONNECTICUT.

CRANKING DEVICE.

1,171,309.  Specification of Letters Patent.  Patented Feb. 8, 1916.

Application filed March 8, 1915. Serial No. 13,061.

*To all whom it may concern:*

Be it known that I, LAWRENCE BENSON, a citizen of the United States, residing at Norwich, in the county of New London, in the State of Connecticut, have invented a certain new and useful Improvement in Cranking Devices, of which the following is a specification, reference being had to the accompanying drawings.

The object of this invention is to provide a manual starter, of the crank type, for automobile engines, which will effectually prevent accidents due to back-firing of the engine; my invention being of such a character and construction that it may be cheaply produced and may be readily applied to automobiles as now commonly constructed.

In order to explain my invention I have provided the annexed drawings, in which—

Figure 1:
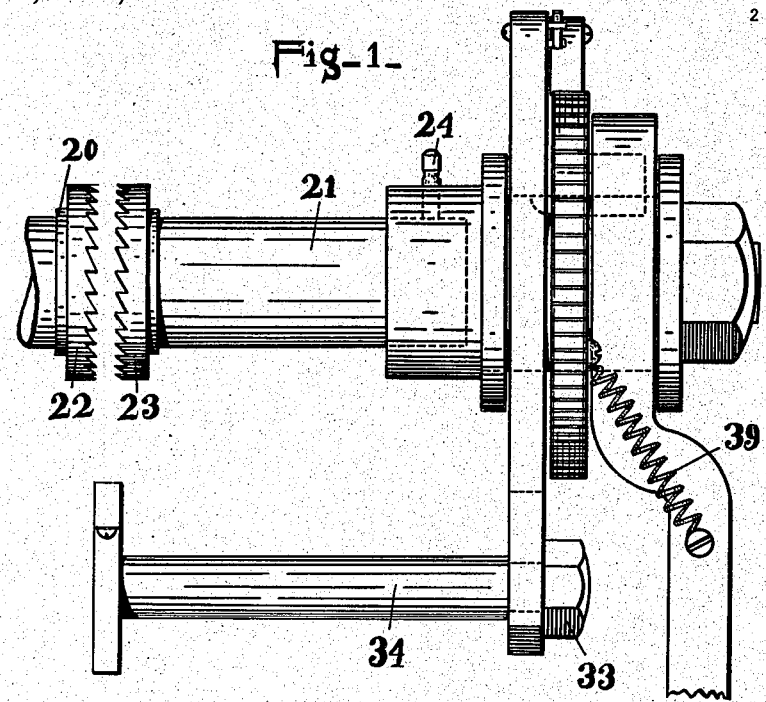
Figure 2:
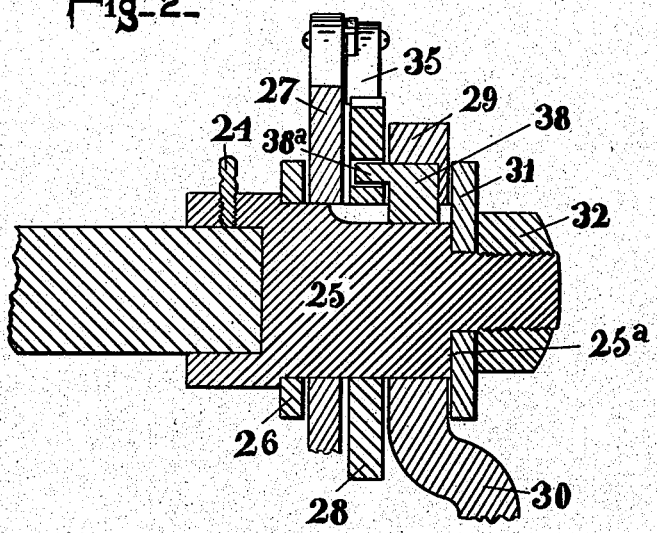

Figure 1 is a side elevation of cranking mechanism embodying my present improvement, and Fig. 2 is a central, longitudinal, sectional, view of the same. Fig. 3 is an outer end view of said mechanism. Fig. 4 is a detached, perspective, view of the shaft extension 25, and Fig. 5 is a detached, outer face, view of the combined ratchet and cam disk 28.

Referring to these drawings, the numeral 20 indicates the engine shaft and 21 denotes the alining cranking shaft, the two shafts being adapted to be interlocked during the cranking operation by means of toothed clutch members 22 and 23, as will be understood by reference to Fig. 1 of the drawings. Secured to the outer end portion of the cranking shaft, by means of a set-screw 24, as here shown, is an alining extension 25 which is shouldered down to receive, first, a washer 26, then a pawl-supporting arm or plate 27, then a ratchet disk 28, then the hub portion 29 of a crank-arm 30, then a washer 31 and, last, a nut 32 which is screwed upon the reduced, and threaded, outer end portion of the extension 25, the arrangement of the specified elements being such that the washer 31 is clamped rigidly against a shoulder 25ª of said shaft extension and so that the plate 27, ratchet-disk 28 and crank-hub 29 are retained in their operative positions with respect to each other but are free to rock on the extension 25. The arm 27, as here illustrated, is clamped by a nut 33 to a rod or bolt 34 whose other end is secured fixedly to some rigid part of the automobile, as the frame. Pivoted on one end of the arm 27 is a pawl 35 which engages the ratchet teeth on the perimeter of disk 28, the pawl being retained yieldingly in such engagement by a suitable spring 36.

The body portion of the extension 25 is formed with a plurality of longitudinal grooves or channels 37 and the inner face of the crank-hub 29 is provided with a radial slot 29ª (see dotted lines in Fig. 3) in which is slidably mounted a bolt 38 which has a lateral extension 38ª which lies in a cam-slot 28ª formed in the ratchet-disk 28, see Figs. 2 and 5, the described construction being such that, when the crank-hub is rotated in one direction as, for example, in cranking up the engine shaft, the cam 28ª will force the bolt 38 into one of the channels 37 and will thus lock the crank to the extension 25 and to the cranking shaft 21 so long as the crank is moved in the same direction. Should the cranking shaft, however, be suddenly rotated backward by the back-firing of the engine, or for any other cause, the pawl 35 engaging the ratchet-disk 28, will prevent the backward rotation of said disk, as the initial backward movement of the shaft will cause the blot 38 to be instantly withdrawn from the channel 37 thus releasing the crank from interlocking engagement with the cranking shaft extension and preventing accidents of the type which, occasionally, result from back-firing and the resulting "kicking back" of the cranking shaft.

In order to cause the cam 28ª to automatically force the bolt 38 into the channel 37, when the bolt and channel are in register (during the cranking operation) I provide a spring 39, one end of which is attached to the crank-arm, the other end being attached to the ratchet disk 28. The end of the bolt 38 rides on the perimeter of the extension 25 until it (the bolt) is in register with the said channel when the spring 39, in seeking to contract, rotates the cam disk sufficiently to cause the cam to force the bolt into the said channel.

In contradistinction to the classes of cranking devices which are dependent upon the operation of yielding and uncertain pawls or springs for interlocking the crank-arm with the cranking shaft, my present improvement provides a positive interlocking medium which is also operated as to its locking and unlocking movements by positively and automatically acting means, thus rendering the cranking operation absolutely safe in the event of back-firing of the engine.

Having thus described my invention, I claim as new and wish to secure by Letters Patent:

A cranking device of the type described, including an engine-shaft, a cranking shaft, said shafts having a detachable connection therebetween, and said cranking shaft having an attached member or extension provided with a plurality of longitudinal slots with their outer ends opening out through the corresponding end of said extension, a resiliently controlled ratchet disk having a cam-slot and mounted upon said extension, a resiliently held pawl hung from a fixture and engaging said ratchet-disk, a cranking lever fulcrumed upon said extension and having a radial slot in its inner face, near one end and a bolt having a lateral extension, said bolt being slidably mounted upon said cranking shaft extension, within said radial slot of the cranking lever, and positioned to enter a coincident groove of said cranking shaft extension, the lateral extension of said bolt being received by said cam-slot of said ratchet disk.

LAWRENCE BENSON.

Witnesses:
FRANK H. ALLEN,
ELSIE P. GRUNERT.

Copies of this patent may be obtained for five cents each, by addressing the "Commissioner of Patents, Washington, D. C."